2,841,586
Patented July 1, 1958

2,841,586

N-HYDROXYALKYL DERIVATIVES OF YOHIMBINE

Richard A. Robinson, Morton Grove, Ill., assignor to G. D. Searle & Co., Chicago, Ill., a corporation of Delaware No Drawing. Application April 3, 1956
Serial No. 575,711

7 Claims. (Cl. 260—286)

The present invention relates to N-hydroxyalkyl quaternary ammonium salts and N-trimethoxybenzoyloxyalkyl quaternary ammonium salts of yohimbine. It is particularly concerned with a class of quaternary ammonium salts which can be represented by the structural formula

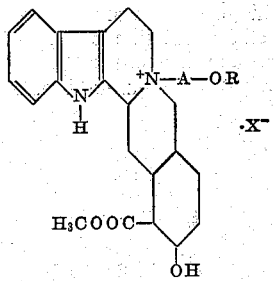

wherein A is a lower alkylene radical separating the groups attached thereto by at least two carbon atoms, R is hydrogen or a 3,4,5-trimethoxybenzoyl radical, and X is one equivalent of a non-toxic anion. The compounds of this class have pharmacological properties superior to those of yohimbine and the simpler salts of yohimbine.

In th foregoing structural formula, the radical A can represent a polymethylene radical such as ethylene, trimethylene, tetramethylene, pentamethylene or hexamethylene. It can also represent other divalent hydrocarbon radicals which are branched-chain isomers of the polymethylene radicals. These include the propylenes, butylenes, amylenes, and hexylenes. The common feature of these radicals is that they interpose at least two carbon atoms between the groups to which they are attached. In the preferred embodiments of this invention, the non-toxic anion which X represents is a halide, although this anion is relatively non-critical and can be, for example, a sulfate.

Compounds of the present invention can be manufactured by the reaction of yohimbine with a haloalkanol. Representative of the haloalkanols which can be employed are ethylene chlorohydrin (2-chloroethanol), ethylene bromohydrin (2-bromoethanol), ethylene iodohydrin (2-iodoethanol), 2-bromo-1-propanol, 1-chloro-2-propanol, 4-chloro-1-butanol, and 6-bromo-1-hexanol. The reaction is conveniently carried out by heating a mixture of yohimbine and the haloalkanol in an inert organic solvent, removing the organic solvent by distillation, and extracting the desired product from the cooled reaction mass with water.

The trimethoxybenzoic acid esters of this invention can be prepared in an analogous manner by heating yohimbine with a trimethoxybenzoic acid ester of a haloalkanol. For example, ethylene bromohydrin is esterified with 3,4,5-trimethoxybenzoyl chloride, and the resulting β-bromoethyl ester of 3,4,5-trimethoxybenzoic acid is heated with yohimbine, whereby there is obtained 4-[β-(3,4,5-trimethoxybenzoyloxy)ethyl]yohimbinium bromide. The same compound is obtained by the selective esterification of 4-(β-hydroxyethyl)yohimbinium bromide with 3,4,5-trimethoxybenzoyl chloride.

The compounds of this invention have useful pharmacological properties. They are depressants of the central nervous system, producing a state of tranquility and ataraxia which is desirable in the treatment of conditions characterized by mental agitation. They have valuable anti-emetic properties. They are also anti-hypertensive agents, and their use is not accompanied by the undesirable side effects which are characteristic of the parent alkaloid yohimbine.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury and quantities of materials in parts by weight.

Example 1

A mixture of 29 parts of yohimbine, 10.6 parts of ethylene bromohydrin and 150 parts of chloroform in an open reaction vessel is heated until substantially all of the chloroform is removed by distillation, after which the non-volatile residue is heated at about 125° C. for an additional 2 hours. The remaining material is extracted with 300 parts of hot water. A residue of about 6 parts of unreacted yohimbine is recovered by filtration, and the aqueous filtrate, which contains the desired reaction product, is evaporated to dryness. The residue is crystallized with ether. For purification it is repeatedly suspended in portions of nitromethane and recovered by filtration. This compound is 4-(β-hydroxyethyl)yohimbinium bromide, which melts with decomposition at about 220–230° C. It has the structural formula

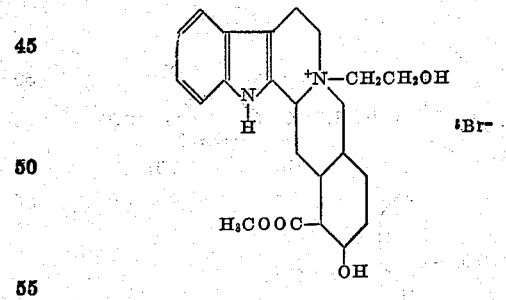

This compound is soluble in water, moderately soluble in lower alkanols, and insoluble in ether.

Example 2

A mixture of 30 parts of yohimbine, 15 parts of ethylene bromohydrin and 225 parts of chloroform in an open reaction vessel is heated in a bath maintained at about 130° C. until substantially all of the chloroform is removed by distillation, and for 2 hours thereafter. The non-volatile residue is extracted with hot water, and the aqueous solution is separated from a small amount of unreacted yohimbine which does not dissolve. The aqueous solution is then washed with chloroform and concentrated to dryness under reduced pressure. The residual product is washed with ether and with acetone, and is then purified by repeatedly digesting it with small portions of nitromethane. In this manner there is obtained 4-(β-hydroxyethyl)yohimbinium bromide, identical with the product of Example 1.

*Example 3*

A solution of 25 parts of 3,4,5-trimethoxybenzoic acid and 65 parts of thionyl chloride is maintained at about 60° C. for 2 hours and is then allowed to stand at room temperature for 16 hours. The thionyl chloride is removed by distillation under reduced pressure. Small portions of benzene are added to the residue and removed by distillation under reduce pressure. A solution of the residue in 27 parts of anhydrous benzene is diluted with petroleum ether, whereupon a crystalline precipitate of 3,4,5-trimethoxybenzoyl chloride separates. This acid chloride is collected on a filter and washed with petroleum ether. A solution of 21 parts of this compound and 12.5 parts of ethylene bromohydrin in 88 parts of anhydrous benzene is heated under reflux for 7 hours and allowed to stand at room temperature for 48 hours. The reaction mixture is diluted with ether and washed with ice water, with several portions of cold, saturated sodium bicarbonate solution, and with several portions of ice water. The ethereal phase is separated, dried and concentrated in a nitrogen atmosphere. Crystallization of the residue from petroleum ether affords β-bromoethyl 3,4,5-trimethoxybenzoate melting at about 63–65° C.

*Example 4*

An intimate mixture of 3.5 parts of yohimbine and 3.5 parts of β-bromoethyl 3,4,5-trimethoxybenzoate is heated at about 150–160° C. for 30 minutes. The cooled, glassy mixture is then ground to a powder and washed with ether. This product, which amounts to about 6 parts, is dissolved in about 90 parts of a solvent mixture containing equal parts by volume of water and methanol. This aqueous methanolic solution is extracted with a total of 60 parts of chloroform in 4 equal portions. The combined chloroform solution is dried over sodium sulfate, filtered, and diluted with ether, whereby the desired product is obtained as an insoluble precipitate. This insoluble product is collected on a filter and purified by recrystallization from a mixture of nitromethane and ether. In this manner there is obtained hygroscopic 4-[β-(3,4,5-trimethoxybenzoyloxy)ethyl]yohimbinium bromide which melts at about 180–185° C. and has the structural formula

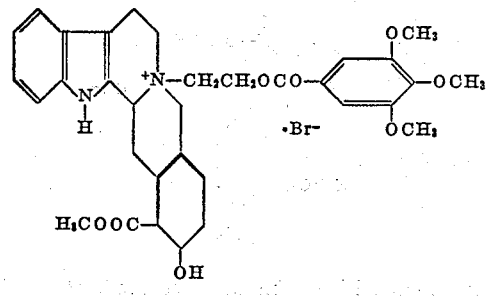

*Example 5*

A mixture of 12 parts of yohimbine, 6 parts of 2-iodoethanol and 75 parts of chloroform in an open reaction vessel is heated in a bath maintained at about 120° C. until substantially all of the chloroform is removed by distillation, and for 2 hours thereafter. The reaction mass is extracted with hot water, and the aqueous extract is separated by filtration from a small amount of unreacted yohimbine which does not dissolve. The filtrate is then washed with a small amount of chloroform and concentrated to dryness under reduced pressure. The residual product is purified by repeatedly digesting it with small portions of nitromethane. The compound thus obtained is 4-(β-hydroxyethyl)yohimbinium iodide.

*Example 6*

A solution of 11 parts of 3,4,5-trimethoxybenzoyl chloride, 55 parts of anhydrous benzene and 7.5 parts of 1-bromo-2-propanol is heated under reflux for 18 hours. The cooled reaction mixture is diluted with ether and washed with ice water, with several portions of cold, saturated sodium bicarbonate solution, and finally with several portions of ice water. The organic phase is separated and concentrated to dryness in a nitrogen atmosphere. The residue, which consists substantially of the α-methyl-β-bromoethyl ester of 3,4,5-trimethoxybenzoic acid is washed with petroleum ether. An intimate mixture of 6.7 parts of this ester and 7.0 parts of yohimbine is heated at about 150–160° C. for 4 hours. The cooled reaction mass is ground to a powder under ether, and the product recovered by filtration is partitioned between aqueous methanol containing equal parts by volume of water and methanol, and chloroform. This is suitably accomplished by dissolving the crude product in about 180 parts of the aqueous methanol, and extracting the resulting solution with a total of 100 parts of chloroform in 4 equal portions. The combined chloroform solution is dried, filtered, concentrated, and diluted with ether, whereby the desired product is obtained as an insoluble precipitate. This product is purified by reprecipitating it from a nitromethane solution by the addition of ether. In this manner there is obtained 4-[β-(3,4,5-trimethoxybenzoyloxy)propyl]yohimbinium bromide of the structural formula

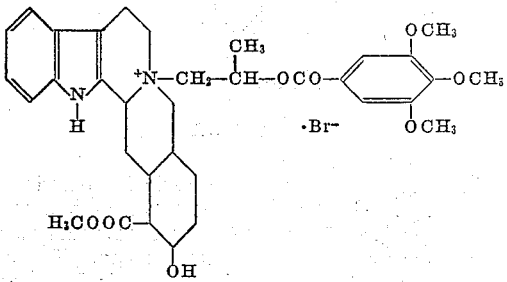

*Example 7*

A mixture of 15 parts of yohimbine, 7.8 parts of 6-bromo-1-hexanol and 150 parts of chloroform is heated in an open reaction vessel until substantially all of the chloroform is removed by distillation, after which the non-volatile residue is heated at about 130–140° C. for an additional 4 hours. The cooled reaction mass is extracted with several portions of hot water, and the combined aqueous extract is separated by filtration from some unreacted yohimbine which does not dissolve. The aqueous filtrate is washed with small portions of chloroform and evaporated to dryness. The residual product is purified by repeatedly digesting it with small portions of nitromethane, and finally by washing it with ether. The compound thus obtained is 4-(6-hydroxyhexyl)-yohimbinium bromide of the structural formula

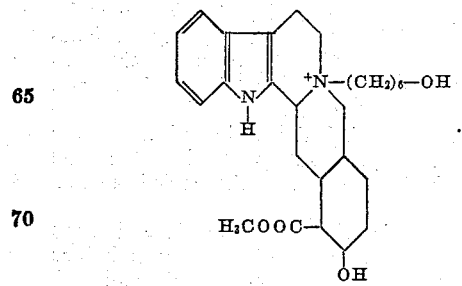

This compound is moderately soluble in water, but insoluble in ether.

What is claimed is:
1. A compound of the structural formula

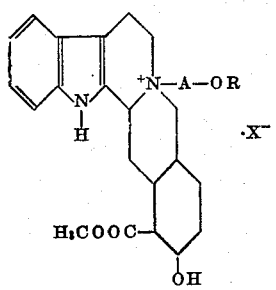

wherein A is a lower alkylene radical separating the groups attached thereto by at least two carbon atoms, R is a member of the class consisting of hydrogen and the 3,4,5-trimethoxybenzoyl radical, and X is one equivalent of a non-toxic anion.

2. A compound of the structural formula

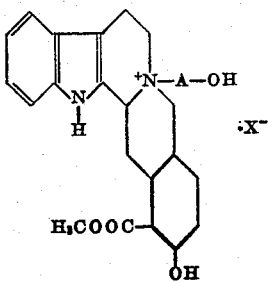

wherein A is a lower alkylene radical separating the groups attached thereto by at least two carbon atoms and X is one equivalent of a non-toxic anion.

3. 4-($\beta$-hydroxyethyl)yohimbinium halide.

4. 4-($\beta$-hydroxyethyl)yohimbinium bromide.

5. A compound of the structural formula

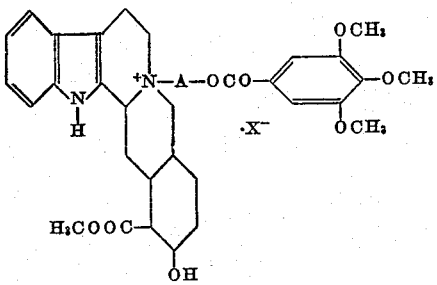

wherein A is a lower alkylene radical separating the groups attached thereto by at least two carbon atoms and X is one equivalent of a non-toxic anion.

6. 4 - [$\beta$ - (3,4,5 - trimethoxybenzoyloxy)ethyl] - yohimbinium halide.

7. 4 - [$\beta$ - (3,4,5 - trimethoxybenzoyloxy)ethyl] - yohimbinium bromide.

References Cited in the file of this patent

Bader et al.: Jour. Amer. Chem. Soc., vol. 77, pp. 3547–3554 (1955).